Nov. 11, 1958     A. J. WRIGHT ET AL     2,859,690
MASTER CARD FEEDING MEANS IN PRINTING MACHINES
Filed May 23, 1955     7 Sheets-Sheet 3

INVENTORS
ANSEL J. WRIGHT
GORDON T. ROSENLUND
BY
Merchant & Merchant
ATTORNEYS

Nov. 11, 1958 A. J. WRIGHT ET AL 2,859,690
MASTER CARD FEEDING MEANS IN PRINTING MACHINES
Filed May 23, 1955 7 Sheets-Sheet 5

INVENTORS
ANSEL J. WRIGHT
GORDON T. ROSENLUND
BY
Merchant & Merchant
ATTORNEYS

Nov. 11, 1958 — A. J. WRIGHT ET AL — 2,859,690
MASTER CARD FEEDING MEANS IN PRINTING MACHINES
Filed May 23, 1955 — 7 Sheets-Sheet 7

INVENTORS
ANSEL J. WRIGHT
GORDON T. ROSENLUND
BY
Merchant & Merchant
ATTORNEYS

United States Patent Office 2,859,690
Patented Nov. 11, 1958

2,859,690

MASTER CARD FEEDING MEANS IN PRINTING MACHINES

Ansel J. Wright and Gordon T. Rosenlund, Minneapolis, Minn., assignors to Master Addresser Company, Minneapolis, Minn., a partnership Application May 23, 1955, Serial No. 510,217

15 Claims. (Cl. 101—65)

Our invention relates generally to printing machinery and more specifically to printing equipment utilizing the spirit transfer process of printing and a plurality of master elements having spirit-responsive transfer material imprinted thereon.

More particularly, our invention is in the nature of a machine of the type herein disclosed which includes a magazine for holding a plurality of master cards in stacked relationship, and means for automatically moving said cards successively from the magazine to a printing position in spaced relation thereto and delivering said cards to a repository after the printing operation is completed.

An important object of our invention is the provision of a novel master card-supporting device which is shiftable in the direction of movement of the card-moving mechanism, whereby said cards may be supported for printing in a plurality of positions thereon.

Another object of our invention is the provision of novel mechanism for returning a card to the magazine in the event of failure of the card-feeding mechanism to make a complete feeding movement, whereby to prevent piling up of the master cards exterior of the magazine and at the printing position thereof.

Another object of our invention is the provision of means for preventing retracting movements of said master cards after the cards have been transferred from the magazine to the full extent of projecting movement of the card-feeding mechanism.

Still another object of our invention is the provision of novel means for rendering the card-feeding mechanism operative or inoperative whereby a selected master card may be subjected to a single printing impression or a plurality thereof as desired.

A still further object of our invention is the provision of a machine as set forth which is adapted for use with master cards having notches in one edge thereof, whereby the master cards may be reversed to cause the transfer matter thereon to be inverted with respect to a predetermined edge of the sheet to be printed, the feeding mechanism for said master cards including a card-engaging feeding lug and being adjustable to cause said feeding lug to engage a card within the notch thereof or the edge of the card opposite said notch.

Another object of our invention is the provision of a machine of the above type having a magazine for holding master cards in stacked relationship, a feeding table for moving the cards singly and in succession from the magazine to a printing position, and a platen movable toward printing engagement with said card, said feeding table and platen being operated by a single lever and linkage connecting said lever to said feeding table and platen independently of each other, and of novel means whereby said linkage may be rendered inoperative to move the feeding table irrespective of movement of said lever and platen.

Another object of our invention is the provision of novel viewing means whereby said master cards may be easily read by the operator during transfer of the cards from the magazine to the printing position thereof.

Another object of our invention is the provision of novel means for receiving the master cards in succession upon completion of the printing operation, said means including a tray movable outwardly from a card-receiving position whereby free access may be had to the cards therein.

Another object of our invention is the provision of a machine of the type herein disclosed which is relatively simple and inexpensive to manufacture, which is highly efficient in operation, and which is rugged in construction and durable in use.

Other highly important objects and advantages of our invention will become apparent from the following detailed specification, appended claims and attached drawings.

Referring to the drawings, which illustrate the invention, and in which like characters indicate like parts throughout the several views.

Referring with greater detail to the drawings, a frame structure is indicated in its entirety by the numeral 1, and comprises a base 2 and primary and secondary generally U-shaped frame members 3 and 4 respectively, the former of which is suitably anchored to the base 2 and the latter of which is welded or otherwise anchored to the rear end portion of the primary member 3. The opposite upstanding portions 5 of the primary frame member 3 are each provided with horizontally disposed guide rails or tracks 6 which support a carriage 7 on which is mounted for common movements therewith, a table 8. The secondary frame member 4 includes laterally spaced generally vertical legs 9 to the upper end portions of which is secured a magazine 10 that overlies the rear end of the table 8 when said table and carriage are moved to one limit of movement thereof on the guide rails 6. In other words, the carriage and table are movable between a receiving position in underlying relationship to the magazine 10 and a printing position adjacent the front end of the machine and remote from the magazine 10. The magazine 10 is adapted to contain a plurality of master cards X of the type illustrated in Fig. 14 and more fully shown and described in the copending application for United States Letters Patent filed by Ansel J. Wright on June 13, 1955, Serial No. 515,099, and entitled "Master Card for Reproduction by the Spirit Transfer Process."

Briefly stated, the cards X are delivered successively by the table and carriage from the magazine 10 to the forwardly disposed printing position with the spirit-responsive carbon material printed on an upper surface portion thereof. For the purpose of the present example, it may be assumed that the spirit-responsive carbon material is in the form of the name and address of a given person or company. An envelope or a sheet of paper has a selected portion thereof moistened with the suitable transfer spirits and this moistened portion is placed over the imprinted carbon material. As will hereinafter be more fully described, the card and paper sheet are subject to printing pressure and a portion of the carbon material will be transferred from the master card to the moistened area. This process of printing is well known as an improved form of hectographic reproduction.

The base 2 defines a well 11 which is adapted to contain an inverted bottle 12 of liquid transfer spirit. An applicator roller 13 is journalled for rotation in the base 2 on a horizontal axis and has its upper circumferential portion disposed slightly above the level of the top surface of the base 2. A flanged plate 14 overlies the top of the base 2 and is provided with a suitable aperture through which the top circumferential portion of the roller 13 projects. It may be assumed that suitable conduit means extends from the well 11 to the portion of the base 2 containing the applicator roller 13 whereby the roller 13 is maintained in a moist condition by the transfer spirits. A pressure roller 15 is mounted for rotation in a bracket 16 that is carried by the front end of an arm 17 which has its rear end portion anchored to one of the legs 9 of the secondary U-shaped member 4. The applicator and pressure rollers 13 and 15 respectively, together with the well 11 and means for conveying spirits from the bottle 12 to the applicator roller, are well known in the art. Hence, for the sake of brevity, further detailed showing and description thereof is omitted.

Figure 5:
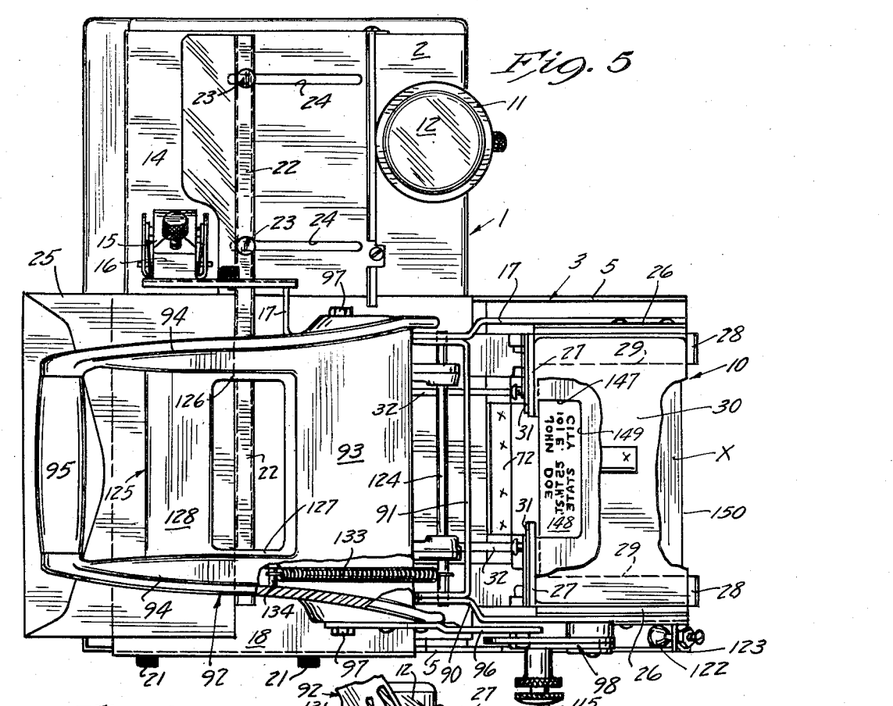
Fig. 5 is a view in plan, some parts being broken away.

A generally U-shaped flat guard plate 18 overlies the front end of the primary frame member 3 the top surface thereof being flush with the top surface of the plate 14. The guard plate 18 is formed to provide a longitudinally extended flange 19 at one side thereof, said flange having a pair of elongated longitudinally aligned slots 20 therein. A pair of locking screws 21 extend one each through a different one of the slots 20, and are screw threaded into the adjacent leg 5 of the frame member 3. Loosening of the screws 21 permits sliding of the guard plate 18 between extreme rear and forward positions of Figs. 1 and 15 respectively, and for a purpose which will hereinafter be described. It will be noted that the top plate 14 and guard plate 18 are in edge-to-edge abutting relationship, whereby to provide a continuous surface. A guide bar 22 extends laterally across the plates 14 and 18 and is provided with a pair of thumb screws 23 which extend downwardly through suitable apertures therein, and through laterally spaced parallel slots 24 in the top plate 14. The screws 23 may be assumed to be provided with locking nuts not shown but disposed in underlying relationship to the top plate 14, whereby the guide bar 22 may be locked in desired set position on the top plate 14 and guard plate 18. As illustrated in Fig. 5, an envelope or the like 25 is placed on the top plate 14 with the side desired to be printed disposed downwardly and with one edge against the adjacent side of the guide bar 22. The envelope is moved laterally between the applicator and pressure rollers 13 and 15 respectively to its printing position illustrated in Fig. 5 and in registration with the carbon imprinted matter on an underlying master card in its printing position on the table 8. Obviously, placement of the guide bar 22 on the top plate 14 determines the location of the printed matter on the envelope 25 when printing pressure is applied thereto.

The magazine 10 comprises a pair of opposed side elements 26 each having inturned front and rear flanges 27 and 28 respectively and inturned bottom flanges 29 which bottom flanges support the opposite end portions of the master cards X contained in the magazine. Preferably, and as shown, a pressure plate 30 is placed upon the stack of cards X to cause the same to be maintained in flat horizontally disposed stacked relationship. Each of the front flanges 27 of the magazine is provided with adjustable retainer bars 31, the lower ends of which are spaced above the plane of the bottom flanges 29 sufficiently to permit passage of but one card X from the magazine at a time. Also mounted on the front flanges 27 is a pair of laterally spaced leaf springs 32 that is utilized to maintain the cards X in a flat condition during travel thereof between the magazine and the advanced printing position thereof.

Figures 15, 16, 17:
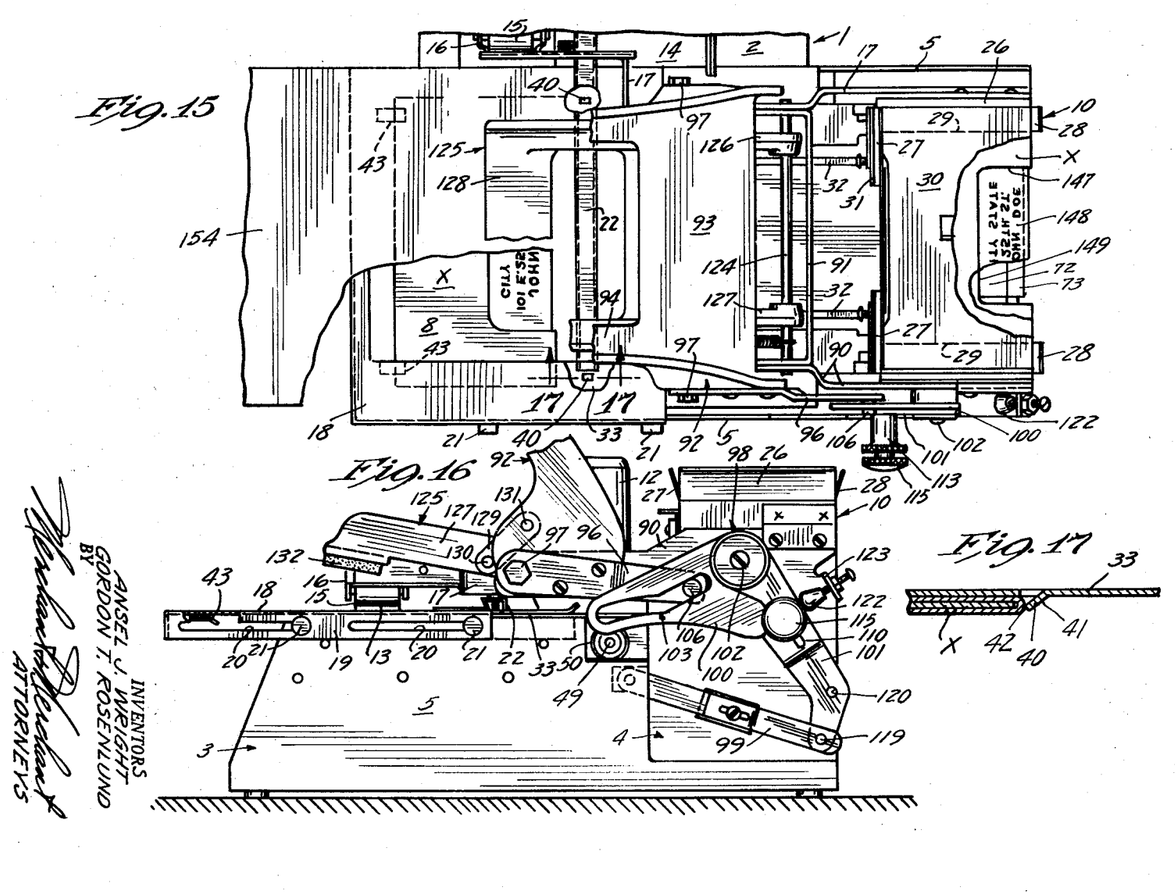
Fig. 15 is a fragmentary view corresponding to Fig. 5 but showing some parts shifted to provide a modified printing arrangement.
Fig. 16 is a view in side elevation of the arrangement illustrated in Fig. 15.
Fig. 17 is an enlarged fragmentary section taken on the line 17—17 of Fig. 15.

A pair of guide flanges 33 extend transversely inwardly from the opposite legs 5 of the primary frame member 3 under the opposite side portions of the guard plate 18 and in overlying closely spaced relation to the top surface of the table 8. Also mounted on the inner surfaces of the opposite legs 5 of the primary frame member 3 is a pair of elongated card-supporting plates 34, each being provided with a downturned flange 35. Pivotally secured at their ends to each of the flanges 35 are stop dogs 36, 37 and 38. Each of said stop dogs is yieldingly biased in an upward direction toward engagement of their free ends with their respective overlying guide flanges 33 by torsion springs 39. The several stop dogs 36—38 normally lie in the path of travel of the master cards X and are moved downwardly thereby during passage of the cards from the magazine to the printing position thereof. As each card X moves forwardly beyond the free end of each stop dog, the torsion spring 39 thereof again moves the dog into the path of the master card whereby to prevent accidental return movement of the card. With reference to Figs. 15 and 17, it will be seen that the guide flanges 33 are each provided with an ear 40 which defines a cam surface 41 and a stop surface or edge 42. The cam surface 41 permits passage therebeyond of a master card X when the same is moving toward its advanced printing position. The stop surface or edge 42 prevents movement of the card X in a rearward direction when the rear edge of said card is positioned forwardly thereof. As shown in Figs. 15 and 16, the guard plate 18 is provided with a pair of laterally spaced stop elements 43 for the purpose of limiting forward movement of the master cards X, so that said cards will be prevented from forward movement due to inertia after forward movement of the table and carriage has stopped.

The carriage 7 comprises a generally rectangular plate-like member 44 having longitudinally extended depending side flanges 45 at opposite sides thereof and reinforcing rails 46 welded or otherwise rigidly secured to the outer surfaces of the flanges 45. An inverted generally U-shaped bracket 47 is anchored to the under surface of the plate-like member 44 adjacent its front end, and includes depending flanges 48 in which are mounted a pair of transversely extending shafts 49 which are disposed in spaced parallel relationship longitudinally of the direction of movement of the carriage 7. Rollers 50 are journalled on the outer ends of the shafts 49 and are adapted to ride on and be supported by the guide rails or track 6 in the primary frame member 3. A transversely central roller is mounted in a fork 52 that is pivotally secured, as indicated at 53, to a mounting bracket 54 welded or otherwise secured to the bottom surface of the plate-like member 44 in rearwardly spaced relation to the shafts 49. The roller 51 is adapted to ride on and be supported by a central longitudinally extending track or rail 55 which projects upwardly from the bottom portions of the frame members 3 and 4, and which extends longitudinally of the direction of travel of the table and carriage. A pair of laterally spaced confining flanges 56, coextensive in length with the track 55, maintain the roller 51 in alignment with the track 55 and prevent lateral movement of the carriage and table during longitudinal travel thereof. The pivotal connection 53 includes a machine screw and lock nut which securely anchor the fork 52 against upward and downward swinging movement, so that when the rear end portion of the table and carriage are once adjusted to proper working height with respect to the overlying magazine 10 and the guide flanges 33, such working height will be maintained. It should be noted that the depending flanges 45 and reinforcing rails 46 are provided with suitable apertures through which the shafts 49 extend, and that the shafts 49 are locked against axial movement with respect to the carriage 8 by snap rings or the like 57 applied to the shafts 49 adjacent the opposed inner surfaces of the bracket flanges 48 in the conventional manner.

Figure 18:
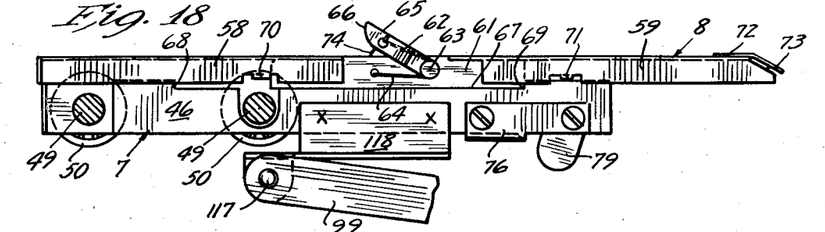
Fig. 18 is a view in side elevation of the feeding carriage and table of our invention, on an enlarged scale, some parts being broken away and some parts shown in section.
Figure 19:
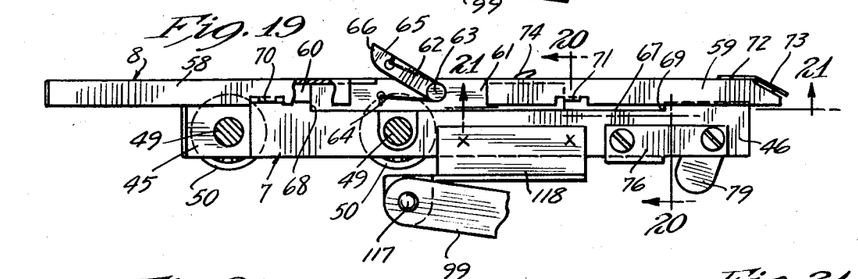
Fig. 19 is a view corresponding to Fig. 18 but showing some parts shifted to a position utilized in the printing arrangement of Figs. 15 and 16.

The table 8 overlies and rests upon the plate-like member 44 and is provided at its opposite side edges with front and rear depending flanges 58 and 59 respectively, the adjacent ends of said flanges being in spaced apart relationship, see particularly Figs. 18 and 19. The flanges 58 and 59 are disposed laterally outwardly of the reinforcing rails 46 whereby to provide suitable spaces 60 between the flanges 58 and 59 and the adjacent flanges 45 of the carriage. Mounted for longitudinal sliding movements in the spaces 60 are longitudinally extending bars 61 to each of which is pivotally secured a feeding dog 62 as indicated at 63. Torsion springs 64 yieldingly bias the feeding dogs 62 upwardly into the path of travel of the master cards X. The dogs 62 each have a top surface 65 which is engaged by the master cards X during retracting movement or rearward travel of the carriage and table, whereby to cause the dogs 62 to be cammed downwardly out of the path of travel of the master cards. The front ends 66 of the dogs 62 engage rear edge portions of the master cards whereby to impart feeding movements to said cards upon forward projecting movements of the carriage and table. It will be noted by reference to Figs. 18 and 19 that the reinforcing rails 46 are provided with upwardly opening, longitudinally extending notches 67 the respective front and rear ends 68 and 69 of which are adapted to engage the front and rear ends respectively of the bars 61 to limit relative longitudinal movement therebetween. The flanges 58 and 59 of the table 8 are provided with inturned ears 70 and 71 respectively which are also adapted to engage the front and rear ends respectively of the bars 61. As shown in Fig. 18, when the table 8 is shifted rearwardly with respect to the carriage 7, the bar 61 is moved to a rearward position wherein the abutment-forming ends 69 of the rails 46 engage the rear ends of the bars 61 to limit rearward movement thereof, and the inturned ears 70 engage the front ends of the bars 61 to lock the same against forward movement. With reference to Fig. 19 it will be seen that, when the table 8 is shifted to a forward position relative to the carriage 7, the inturned ears 71 and the front abutment-forming ends 68 engage the rear and front ends respectively of the bars 61 to lock the same in a forwardly disposed position against longitudinal movement relative to the table and carriage. It should further be noted that the ears 70 and 71 are spaced apart a distance greater than the lengths of the bars 61. With this arrangement, the feeding dog mounting bars 61 are shifted a longitudinal distance less than that of longitudinal shifting of the table 8 with respect to the carriage 7, as will hereinafter be more fully described.

The table 8 at its rear end is provided with a plate-like feeding lug 72 which is adapted to engage a rear edge portion of the bottom master card X in the magazine 10 to move the same forwardly from the magazine during a forward movement of the table and carriage. At its rear end portion, the feeding lug 72 projects angularly rearwardly and downwardly to provide an apron 73 which engages the lowermost master card X in the magazine 10 during rearward retracting movements of the table and carriage and cams the same upwardly so that the weight of the cards X and the pressure plate 30 is carried by the rear end portion of the table when the table is in its fully retracted position. This arrangement insures proper engagement of the lowermost master card X by the front edge of the feeding lug 72.

For the purpose of automatically retracting a master card engaged by the feeding lugs 72 in the event that the table and carriage are caused to move rearwardly to their retracted positions before a full advancing movement has been effected, we provide a pair of hook-like retracting lugs 74 on the forward end of a pair of levers 75 which extend generally longitudinally of the direction of movement of the table and carriage, and which are pivotally secured intermediate their ends to brackets 76 rigidly mounted on the side rails 46 of the carriage 7 adjacent the rear end thereof. The hook-like ends 74 are movable upwardly and downwardly into and out of the path of travel of the cards X through aligned openings 77 and 78 in the carriage 7 and table 8 respectively. At their rear ends, the levers 75 are provided with depending cam-acting ears 79 which are of a size to cause the rear ends of the levers 75 to over-balance the front ends thereof, whereby the retracting lugs 74 are yieldingly biased by gravity into the path of travel of the master cards X. A pair of stationary cam-engaging elements 80 is welded or otherwise secured to the rail 55, each being engageable with a different one of the ears 79 to raise the same just before the carriage and table reach their limit of forward travel. Obviously this raising of the ears 79 by the cam-acting elements 80 causes the retracting lugs 74 to be moved below the top surface of the table 8 so that the table and carriage may be retracted without retracting the master card X which has been transferred forwardly from the magazine to the desired extent. In the event that return movements are imparted to the table and carriage before the retracting lugs 74 have been moved downwardly as described, said retracting lugs will engage the front edge of the card X and return the same to the magazine. Thus, improper feeding of the master cards and consequent faulty operation of the machine is eliminated.

Figure 7:
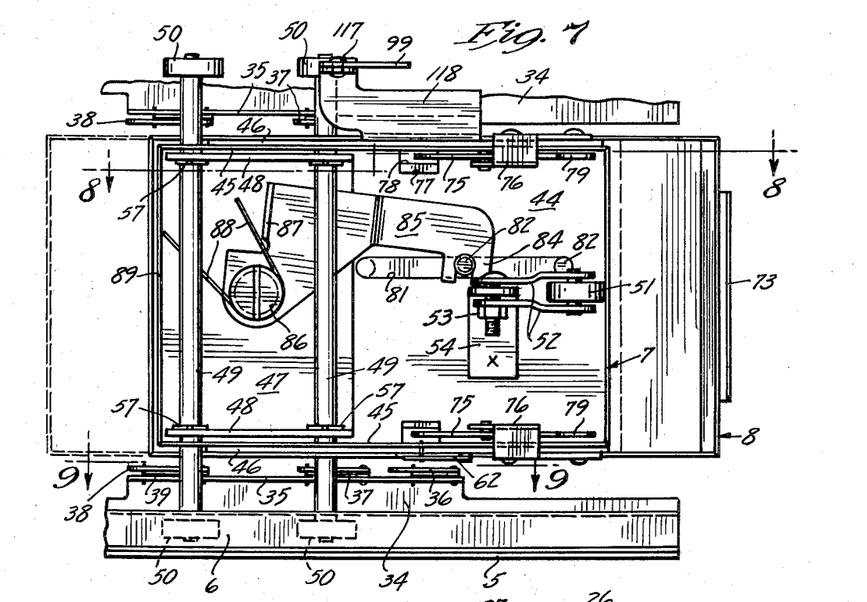
Fig. 7 is an enlarged fragmentary view partly in bottom plan and partly in section, taken substantially on the line 7—7 of Fig. 6.
Figures 8, 9:
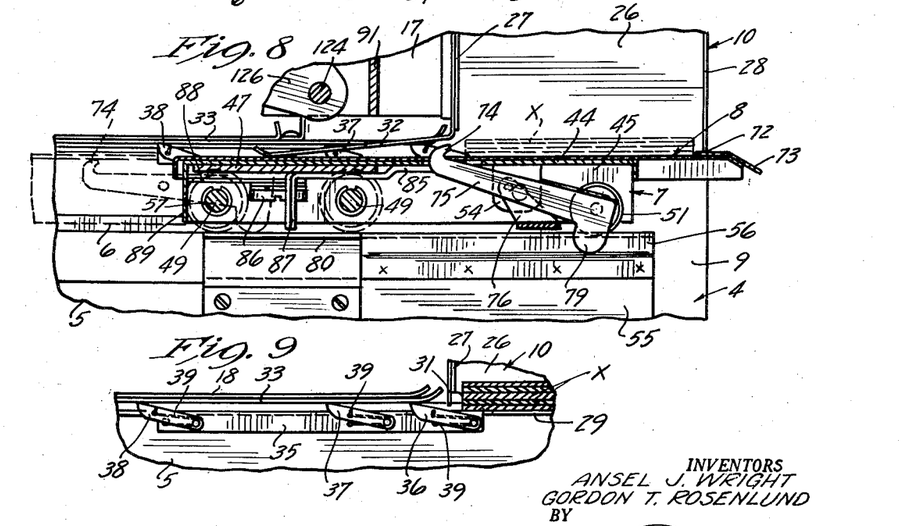
Fig. 8 is a fragmentary vertical section taken substantially on the line 8—8 of Fig. 7.
Fig. 9 is a fragmentary section taken substantially on the line 9—9 of Fig. 7.
Figure 20:
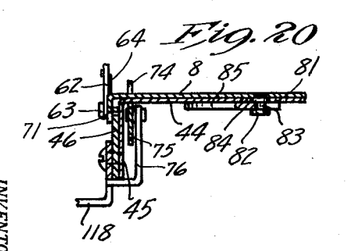
Fig. 20 is a fragmentary transverse section taken substantially on the line 20—20 of Fig. 19.
Figure 21:
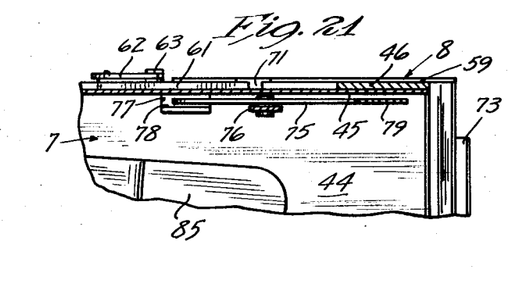
Fig. 21 is a fragmentary view partly in bottom plan and partly in horizontal section, taken substantially on the line 21—21 of Fig. 19.

The plate-like member 44 of the carriage 7 is provided with a longitudinally extending slot 81 through which projects a pair of downwardly extending longitudinally spaced pins 82 which are anchored at their upper ends in the table 8, see Figs. 7 and 20. Each of the pins 82 is provided with a circumferentially extended groove 83 that is adapted to selectively receive the bifurcated end 84 of a latch lever 85 that is pivotally secured to the bracket 47 by means of a pivot screw or the like 86. The latch lever 85 is provided with a depending handle member 87 by means of which the lever 85 may be swung out of engagement of its bifurcated end 84 with the adjacent pin 82. A torsion spring 88 coiled about the pivot screw 86, has one end portion engaging the handle portion 87 of the lever 85 and its other end engaging a depending flange 89 at the front end of the carriage 7, to yieldingly urge the lever 85 into latching engagement with a selected one of the pins 82. Thus, the table 8 may be releasably locked in its rearward shifted position relative to the carriage 7 as shown in Fig. 18, or in its forwardly shifted position relative to the carriage 7 as shown in Fig. 19.

Figure 2:
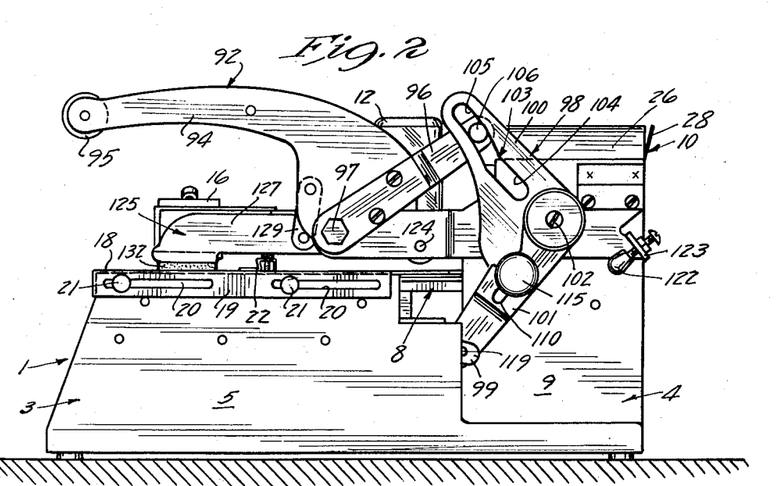
Fig. 2 is a view corresponding to Fig. 1 but showing a different position of some of the parts.
Figure 3:
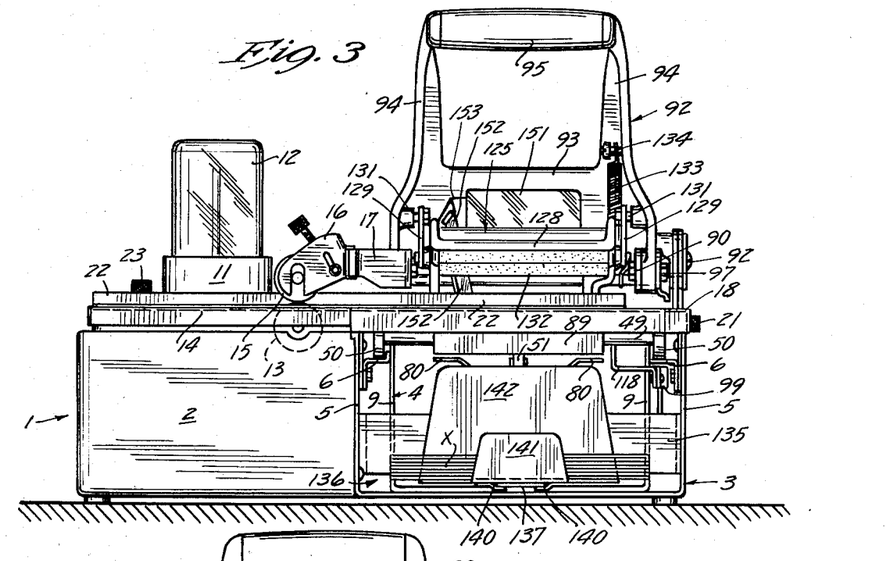
Fig. 3 is a view in front elevation.
Figure 4:
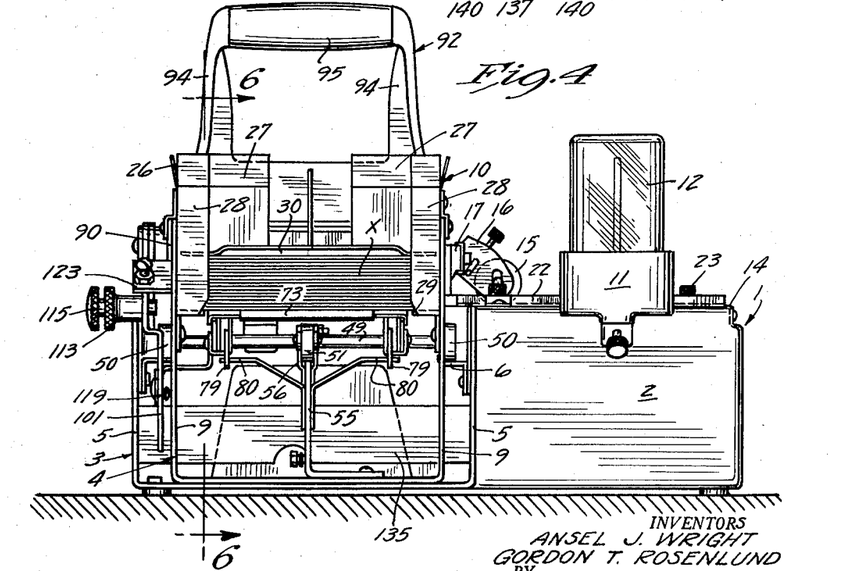
Fig. 4 is a view in rear elevation.

We provide novel means for imparting advancing and retracting movements to the carriage 7 and table 8, now to be described. With reference to Figs. 3, 4 and 5, it will be seen that the arm 17 is disposed adjacent one of the sides 5 of the U-shaped frame member 3 adjacent the base 2 of the machine. A second supporting arm 90 is rigidly secured at its rear end to the leg 9 of the frame member 4 opposite the supporting arm 17, the arms 17 and 90 being connected by a transversely extending cross arm 91 forwardly of the magazine 10, see Figs. 5 and 6. A relatively wide operating lever 92 comprises a transversely extending web portion 93 and upwardly and forwardly extending lever arms 94 that are connected at their outer ends by an operating handle 95. The lever 92 further includes a lever arm 96 screwed or otherwise rigidly anchored to the lower end of one of the arms 94, and projects generally rearwardly of the machine. The lever 92 is pivotally secured by pivot bolts or the like 97 to the supporting arms 17 and 90 on aligned axes. The lever 92 is coupled to the carriage 7 by linkage including a bell crank lever 98 and a pitman arm 99, whereby forward and downward movement of the lever arms 94 will cause advancing movement to be imparted to the carriage 7 and table 8 and upward and rearward swinging movement of the lever arms 94 will cause the carriage 7 and table 8 to be retracted to their limit of rearward movement. The bell crank 98 comprises a pair of cooperating lever arms 100 and 101 that are pivotally mounted on a screw or bolt 102 screw threaded into the rear end portion of the supporting arm 90, for swinging movements independently of each other. The bell crank arm 100 is provided with a cam slot 103 having a relatively straight portion 104 and a curved portion 105, which curved portion is concentric to the axis of the pivot bolts 97 when the bell crank arm 100 is disposed in a given position of its swinging movement. A cam follower roller 106 is journalled in the outer end of the lever arm 96 and is contained within the cam slot 103. The particular arrangement is such that, during initial movement of the lever 92 from its position of Fig. 1 toward that of Fig. 2, the cam follower 106 will cause forward and upward swinging movement of the bell crank arm 98. As the lever 92 approaches its position of Fig. 2, the roller 106 enters the arcuate portion 105 of the slot 103. The arcuate portion 105 now being concentric with the axis of the pivot bolts 97, no further movement will be imparted to the bell crank arm 100 during the remaining movement of the lever 92 toward its position of Fig. 2. Obviously, during initial return movements of the lever 92 toward its position of Fig. 1, no return movement of the bell crank arm 100 occurs until the roller 106 enters the relatively straight portion 104 of the slot 103.

Figures 11, 12, 13:
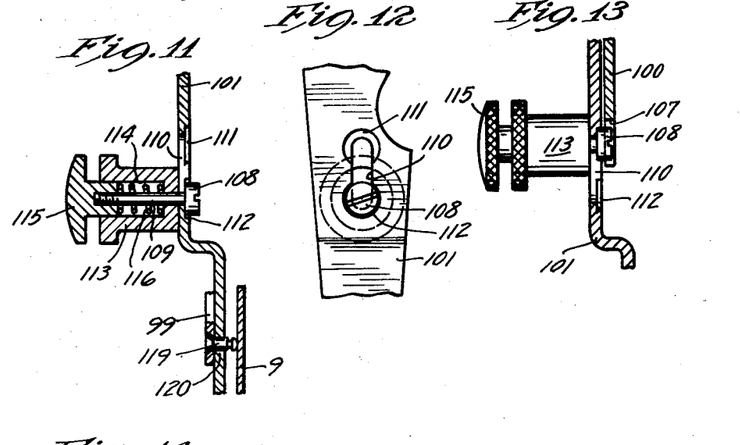
Fig. 11 is an enlarged fragmentary detail taken substantially on the line 11—11 of Fig. 10.
Fig. 12 is a fragmentary view in side elevation as seen from the right to the left with respect to Fig. 11.
Fig. 13 is an enlarged fragmentary section taken substantially on the line 13—13 of Fig. 1.

The bell crank arm 100 is provided with a notch 107 that is adapted to receive the head 108 of a locking pin 109 that is mounted in a radially extended slot 110 in the bell crank arm 101. As shown in Figs. 11–13, the bell crank 101 is provided with a pair of recesses 111 and 112 which communicate with opposite ends of the slot 110, and which partially receive the head 108 to lock the head and pin 109 against radial movement with respect to the bell crank arm 101. The pin 109 extends axially through a flanged bushing or sleeve 113 which has its inner end slidably engaging the outer surface of the bell crank arm 101 and which is provided with an axially extending recess 114 in which is mounted for axial sliding movements a button 115 secured to the outer end of the pin 109. A coil compression spring 116 encompasses the pin 109 within the recess 114 and exerts a yielding bias on the sleeve 114 and the button 115 in directions to maintain the inner end of the sleeve 114 against the bell crank arm 101 and the head 108 toward the opposite side of said bell crank arm 101 and the recesses 111 and 112 therein. When pressure is exerted on the button 115 against bias of the spring 116, the head 108 of the pin 109 is moved axially outwardly with respect to the recesses 111 and 112, whereupon the pin 109 and sleeve 113 may be moved radially on the arm 101. When the arm 101 is moved about the axis of its pivot screw 102 to a point where the slot 110 is in register with the notch 107 on the arm 100, the head 108 of the pin 109 may be moved into the notch 107 whereupon release of the button 115 will permit the head 108 to be moved axially into the recess 111 whereby to cause the bell crank arms 100 and 101 to be locked together for common movements, and the head 108 to be locked against radial movement in the slot 110, see Figs. 1, 2 and 13. When the pin 109 is moved to the opposite end of the slot 110, the head 108 may be locked in the recess 112, leaving the bell crank arms 100 and 101 free for independent movement.

Figure 1:
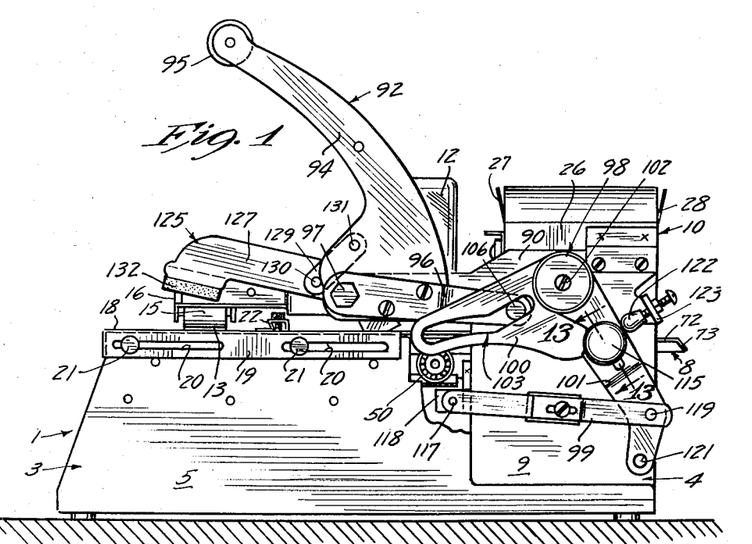
Fig. 1 is a view in side elevation of the printing machine of our invention.

The pitman arm 99, although shown in Fig. 1 as being adjustable in length, may be considered as a unitary structure, inasmuch as this adjustment is made only at assembly. The front end of the pitman arm 99 is pivotally secured by a pin or the like 117 to a bracket or the like 118 welded or otherwise rigidly secured to the adjacent side rail 46 of the carriage 7. At its rear end, the pitman arm 99 is provided with a transversely extending pin 119 which is selectively received in each of a pair of radially spaced apertures 120 and 121 in the outer end portion of the bell crank arm 101, see Figs. 1 and 16. It will be appreciated that, when the pin 119 is placed in the aperture 121, the extent of travel of the carriage 7 and table 8 will be greater than when the pin 119 is contained within the aperture 120, for the same amount of travel of the lever 92 and bell crank 98. An adjustable bumper or cushion element 122 is mounted on an outturned ear 123 at the rear end of the arm 90 whereby to limit swinging movement of the bell crank 98 in a direction of rearward movement of the carriage and table.

Figure 6:
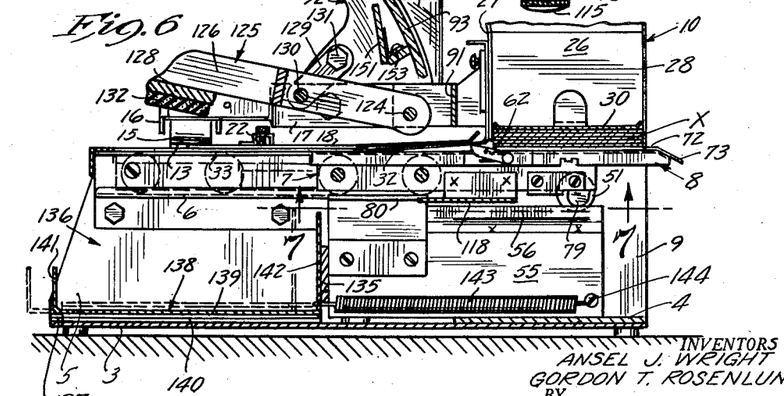
Fig. 6 is a vertical section taken substantially on the line 6—6 of Fig. 4, some parts being broken away.

With reference to Figs 5 and 6, it will be seen that the opposite ends of the cross arm 91 are disposed at substantially right angles to the intermediate portion thereof, and it may be assumed that said opposite ends are welded or otherwise rigidly anchored to the supporting arms 17 and 90. A transverse shaft 124 has its opposite end portions journalled in aligned apertures in the arms 17 and 19 and the adjacent inturned ends of the cross arm or bar 91. A relatively wide frame-like mounting arm 125 comprises a pair of longitudinally extending side members 126 and 127 and a transversely extended bridge element 128 connecting the outer ends of the side members 126 and 127. The inner or rear ends of the side members 126 and 127 are journalled on the transverse shaft 124 whereby the arm 125 may be swung in an upward or downward direction. We provide a pair of rigid links 129 one each of which is disposed adjacent a different one of the side members 126 and 127. The links 129 have their lower ends pivotally secured to the adjacent side members as indicated at 130, and their upper ends pivotally secured to an adjacent side portion of the lever 92 as indicated at 131. Said links 129 transfer forward and downward swinging movements of the operating lever 92 to the arm 125 so that the front end thereof moves downwardly toward engagement with the front end of the table 8 when the table is in its advanced position. An elastic platen 132, preferably made from rubber or the like, is adhered to the bottom surface of the bridge element 128 and exerts printing pressure on the piece to be printed and the underlying transfer carbon imprinted portion of the master card X in its advanced printing positon on the table 8, when the operating lever 92 is moved to its printing position of Figs. 2 and 5. With reference to Figs 3 and 5, it will be seen that the operating lever 92 is yieldingly biased in a direction to move the carriage and table in a rearward retracting direction by a coil tension spring 133 having one end secured to the shaft 124 and its other end secured to an anchoring screw or the like 134 in one of the side members 94 of the operating lever 92. It will be further noted that the shaft 124 is disposed in spaced parallel relationship to the pivot axis of the lever 92.

Figure 14:
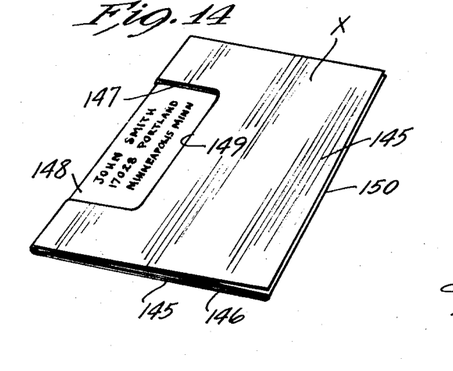
Fig. 14 is a view in perspective of a master card used in connection with the instant machine.

Mounted in the U-shaped frame member 3 between the legs 5 thereof is a transversely extending bar 135 which cooperates with the front ends of the upstanding portions 5 to define a card-receiving chamber 136 forwardly of the track or rail 55. Mounted on a longitudinally extending way 137 in the bottom of the chamber 136 is a card-receiving tray 138 having a bottom wall 139 which is provided with gibs 140 which engage the way 137, and upstanding front and rear wall elements 141 and 142 respectively. The tray 138 is yieldingly biased toward engagement of its rear wall 142 with the cross bar 135 by a coil tension spring 143 having one end secured to the rear wall 142 and its opposite end anchored to the bottom portion of the rail 55 as indicated at 144. The master cards X, one of which is shown in its entirety in Fig. 14, are preferably made from paper card material and are folded to provide outer plies 145 and an intermediate ply 146. Each card X is further cut to provide a longitudinally extending notch 147 in one longitudinal edge thereof, and a master sheet 148 is inserted between the inner ply 146 and one of the outer plies 145, said master sheet substantially filling the notch 147. The master sheet 148 has imprinted thereon with spirit-sensitive carbon material, the legend to be reproduced. Obviously, this printed material is contained within the area defined by the notch 147, the bottom 149 of which is parallel to the opposite longitudinal edge 150 of the card X.

A pair of elongated mirrors 151 and 152 are mounted on a bracket 153 which is secured to the web portion 93 of the operating lever 92. The mirror 151 is elongated in a direction transversely of the direction of travel of the carriage and table, whereas the mirror 152 extends in a generally upward and downward direction at an oblique angle to the vertical. The angular disposition of the mirrors 151 and 152 with respect to the top of the table 8, when the operating lever is in its inoperative position of Fig. 1, is such that each of said mirrors reflects a different area of the top surface of the table 8 to the eye of an operator stationed in front of the machine.

The machine of the instant invention is adapted to utilize the master cards X with the notches 147 thereof directed forwardly as shown in Fig. 5, or rearwardly as shown in Fig. 15. Preferably, the notches 147 are disposed forwardly when it is desired to reproduce names and addresses on mailing envelopes such as the envelope 25. In such event, the table 8 is shifted rearwardly with respect to the carriage 7 as is shown in Fig. 18, the latch 85 engaging the forward pin 82 of the table 8 to maintain this relative relationship between the carriage and table. In addition, the pitman arm-carried pin 119 is inserted in the radially inward aperture 120 of the bell crank arm 101, and the arms 100 and 101 latched together by reception of the head 108 in the notch 107. The guard plate 18 is also locked in its position of Fig. 1 by tightening of the thumb screws. The guide bar 22 is adjusted to the desired spacing therebetween and the moistening roller 13, and the desired number of master cards are vertically stacked in horizontally disposed positions in the magazine 10 and the pressure plate 30 laid thereupon. With the table and carriage in their retracted positions, the bottom card X in the magazine resting upon the rear end portion of the table, the plate-like primary feeding lug 72 is disposed slightly behind the bottom master card X in the magazine. A forward and downward movement of the operating lever 92 by the operator causes the primary feeding lug 72 to engage the rear edge 150 of the bottom master card X and carry the same forwardly to an intermediate position forwardly of the magazine 10 and below the horizontally extended mirror 151. During this forward travel, the card X rides over the stop dogs 36 and 37, moving the same downwardly, until the rear edge 150 of the card passes the stop dog 36, which under bias of its spring 39, moves upwardly into the path of travel of the card to stop the same against rearward movement. Also, during the forward movement of the carriage and table, the cam-acting ears 79 engage the elements 80 to cause the retracting lugs 74 to be moved downwardly below the level of the top surface of the table 8, so that upon subsequent retracting movement of the table, the retracting lugs will pass rearwardly under the overlying card X in its intermediate position. As above indicated, in the event that the operating lever 92 is not depressed sufficiently to cause the cam-acting ears 79 to engage the elements 80, in which case the bottom master card X in not withdrawn fully from the magazine 10, the retracting lugs 74 will engage the front edge of the card X, and move the same rearwardly into the magazine. It will be appreciated that the rear stop dog 36 is located sufficiently forwardly of the magazine to be engaged and depressed by the bottom master card X until the same has been fully withdrawn from the magazine and has very nearly reached the desired intermediate position.

After the carriage and table have been moved to their forward position to deliver the first master card X to its intermediate position, the operator releases the handle 95 to permit return of the lever 92 and the carriage and table to return to their retracted positions. During this return movement, the table 8 slides rearwardly with respect to the first master card X which is restrained against rearward movement by engagement of the stop lugs 36 with the rear edge 150, until said first card overlies the front end portion of the table 8. During this rearward movement of the table 8, said first card is maintained in sliding contact with the table by the leaf springs 32, the front ends of which bear lightly downwardly on the card. With the first card X in its intermediate position, and the operating lever 92 in its inoperative position of Fig. 1, the operator is enabled to clearly read the printing on the master sheet within the notch 147 thereof. The mirror 151 reverses the printed material so that the same appears in its normal state. The operator then moves an envelope 25 from the left to the right with respect to Fig. 3 between the rollers 13 and 15, thus causing the addressed side of the envelope to be moistened with the transfer spirit carried by the pressure roller 13, and the envelope is caused to overlie the guard plate 18. The operator then moves the operating handle 92 forwardly and downwardly, whereupon the ends 66 of the feeding dogs 62 engage the rear edge 150 of the first card X and move the card X to a point where the legend on the master sheet is in register with the moistened strip of the envelope 25. Further downward movement of the operating lever 92 causes the platen 132 to press downwardly upon the envelope 25 so that printing contact is made therebetween and the spirit-sensitive carbon printed material on the master sheet 148, the front end portion of the table underlying the same and serving as a base of resistance against pressure of the platen 132. Obviously, during the second operative movement of the lever 92, a second master card is moved outwardly from the magazine 10 by engagement of the rear edge 150 thereof by the primary feeding lug 72. It will be noted, that during the first retracting movement of the table 8, the first delivered master card X, while it is being held against rearward movement by the dogs 36, engages the top surfaces 65 of the secondary feeding dogs 62 and cams the same downwardly, so that when the table 8 reaches its retracted position, the secondary feeding dogs 62 are disposed rearwardly of the rear edge 150 of the first delivered card X, and the springs 64 thereof cause the same to be moved upwardly into a position to engage said rear edge.

Inasmuch as the feeding movement of the carriage and table is fairly rapid, the stop lugs 43 limit inertia imparted forward movement of the card X beyond its advanced printing position. After momentary printing pressure has been applied to the envelope 25 and the underlying master card, the operator again releases the lever 92 to again permit retraction of the carriage and table. It will be noted that, during movement of the master card X from its intermediate to its advanced printing position, the same will depress the stop dogs 38 and move forwardly beyond the front ends thereof after which the springs 39 of the stop dogs 38 will return the same to the path of travel of the cards and prevent subsequent rearward movement of the card during retracting movements of the table and carriage. Then, when the table is retracted, the used master card X will fall by gravity onto the tray 138 within the receiving chamber 136. When all of the master cards have been run through the machine as above described, the operator grasps the front wall element 141 of the tray and moves the same forwardly against bias of the spring 143 to a position wherein the master cards therein are easily grasped and removed.

As indicated in Figs. 5, 14 and 15, the spirit-responsive carbon legend imprinted on the master sheets 148 of the cards X reads inwardly from the adjacent edge of the card toward the bottom edges 149 of the notches 147. Thus, when the machine is operated as above described, the envelopes 25 or sheets to be printed have their bottom edges in sliding engagement with the guide bar 22. In the case of names and addresses for envelopes and the like, the legend becomes properly spaced from the bottom edge of the envelope without the necessity of allowing for an overly wide range of adjustment of the guide bar 22. For the purpose of imprinting a given legend at the top portion of a sheet of paper or the like, such as is indicated by the numeral 154 in Fig. 15, with such legend reading downwardly from the adjacent edge of the sheet, the machine is adjusted as follows:

The latch 85 is released and the table 8 moved forwardly on the carriage to its position illustrated in Fig. 19 and by dotted lines in Fig. 7 after which the latch 85 is released to engage the rearmost depending pin 82 of the table 8. The guard plate 18 is moved forwardly with respect to the frame structure to its position of Figs. 15 and 16 and locked in place by the locking screws 21. The pin 119 on the rear end of the pitman arm 99 is removed from the aperture 120 and placed in the lower aperture 121 of the bell crank arm 101. The guide bar 22 is then adjusted forwardly or rearwardly so as to properly position the sheet of paper 154 with respect to the material to be printed. The master cards X are then placed in the magazine 10 with the spirit-responsive carbon material facing upwardly and with the notches 147 directed rearwardly with respect to the machine, see Fig. 15. It will be noted that the primary card-engaging lug 72, being moved forwardly on the carriage, is contained within the notch 147 of the lowermost card X when the table and carriage are in their retracted position in underlying relationship to the magazine. Forward and downward movement of the operating lever 92 causes the plate-like primary lugs 72 to engage the bottom portion 149 of the notch 147 to move the lowermost card X forwardly out of the magazine. The pin 119 of the pitman arm 99 being positioned in the aperture 121 of the bell crank arm 101, the carriage and table will travel forwardly a greater distance than as heretofore described, with the same operating movement of the lever 92. Also as above described, the card X is moved from the magazine to an intermediate position during the first operating stroke of the lever 92. It should be further noted, that when the table 8 is shifted forwardly with respect to the carriage 7, the feeding dogs 62 are also shifted forwardly with respect to the carriage 7 but rearwardly with respect to the table 8. This rearward shifting of the dogs 62 with respect to the table 8 is equivalent to the depth of the notch 147 in the master card X, so that, after the initial operating movement of the lever 92, when the carriage and table are again retracted, the front edges 66 of the feed dogs 62 will engage the rearwardly disposed edge of the card X laterally outwardly of the opposite ends of the notch 147. Furthermore, when the master card X reaches its intermediate position, the rearwardly disposed edge of the card is situated just forwardly of the feed dogs 37 which engage the rearwardly disposed edge of the card X to move the same forwardly to its printing position upon a subsequent operating movement of the lever 92. It should be obvious that the retracting lugs 74 operate with this arrangement in the same manner as heretofore described. When the card X has been moved to its new advanced printing position, the rearwardly disposed edge thereof adjacent the opposite ends of the notch 147 is disposed forwardly of the abutment edges 42 of the downturned lugs 40 of the guide flanges 33. Thus, after the printing operation, and upon subsequent return movement of the table and carriage, the cards X engage the stop edges 42 of the ears 40 and are prevented from rearward movement with the table and carriage. During forward movement of the table and carriage and advancing of the card to its printing position, the leading edge of the card engages the sloping surface 41 of the lugs 40 and are cammed downwardly thereby so as to permit forward movement of the card X therebeyond.

When each card X is delivered to its latter-described intermediate position, and the operating lever 92 permitted to return to its normal position, the carbon-imprinted legend on the master sheet is clearly readable through the upwardly and downwardly extended mirror 152. Thus the operator can check each master card after it has been projected from the magazine and before movement thereof to its printing position, so that printing of unwanted material may be avoided.

Figure 10:
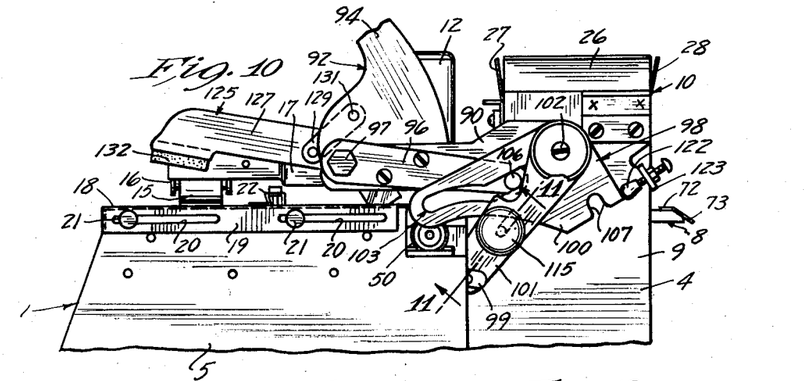
Fig. 10 is a fragmentary view corresponding to Fig. 1 but showing a still different position of some of the parts.

When it is desired to duplicate material from the same master card on several sheets of paper, it it merely necessary for the operator to move the pin 109 with its head 108 out of registration with the notch 107 and to its position illustrated in Figs. 10-12, the bell crank arm 101 being positioned as illustrated in Fig. 10. In this position of the bell crank 101, the carriage and table are disposed in their advanced printing position, and the lever 92 may be operated to cause the desired number of impressions to be made by the platen 132 without causing feeding movements to be imparted to the table and carriage. Then, when it is desired to resume normal feeding movements of the table and carriage, it is merely necessary to move the pin 109 so that the head 108 thereof is received within the notch 107.

Our invention has been thoroughly tested and found to be completely satisfactory for the accomplishment of the objectives set forth; and while we have shown and described a commercial embodiment of our novel printing machine, it will be understood that the same is capable of modification without departure from the spirit and scope of the invention as defined in the claims.

What we claim is:

1. In a printing machine utilizing the spirit transfer process and a plurality of cards having material to be reproduced imprinted thereon, a frame structure, a magazine for holding said cards in horizontally disposed vertically stacked relationship, a carriage element mounted in said frame structure for reciprocatory movements between a retracted card-receiving position adjacent said magazine and an advanced printing position spaced therefrom, a table element mounted on said carriage element for common movements therewith, one end of said table underlying said magazine when the carriage element is moved to its retracted position, a primary card-engaging member on one of said elements for moving said card from said magazine to an intermediate position at said one end portion of said table element upon advancing movement of said table element, one way stop means permitting advancing movement of said card and holding said card at its intermediate position against common retracting movement with said table element, whereby said card overlies the other end portion of said table element when the table element is moved to its retracted position, a secondary card-engaging member carried by one of said elements for moving said card with the table element to an advanced printing position upon a subsequent advancing movement of said carriage element, means including an operating lever pivotally mounted on said frame structure and linkage connecting said lever to said carriage for imparting said reciprocatory movements to said carriage and table elements, and a platen operatively coupled to said lever and mounted for lever imparted movements toward and away from engagement with said card in its advanced position on the table element.

2. The structure defined in claim 1 in which said table element is mounted for limited movement relative to said carriage in the direction of movement of said carriage, and in further combination with means for releasably locking said table element at either limit of said movement with respect to the carriage, whereby to cause selected portions of said table element and a card thereon to be positioned in the path of movement of said platen upon movement of said carriage and table element to their advanced positions.

3. The structure defined in claim 1 in further combination with a second one way stop element mounted on said frame structure and permitting advancing movement of a card to its advanced printing position and engaging said card in its advanced position to hold the same against common retracting movement with said table element, said frame structure providing a receptacle underlying said table element in the advanced position thereof and adapted to receive said card upon retracting movement of said table and carriage elements.

4. The structure defined in claim 1 in further combination with means for returning a primary member engaged card to said magazine upon failure of said table and carriage elements to make full advancing movement prior to movement thereof to their retracted positions, said means comprising a card-engaging return member mounted on one of said elements for common advancing and retracting movements therewith and for movements with respect thereto into and out of the path of travel of said card, and means for moving said return member out of said path of travel during final movement of said card to its intermediate position.

5. The structure defined in claim 4 in which said return member includes a card-engaging portion and a cam element, and in which said last-mentioned means comprises a stationary cam-engaging element lying in the path of travel of said cam element and positioned to engage said cam element during said final movement of said card to its intermediate position, whereby to move said cam element and return member in a direction to cause movement of the card-engaging portion thereof out of the path of travel of said card.

6. The structure defined in claim 1 in which said table element is mounted for limited movement relative to said carriage element in the direction of movement of said carriage element, and in further combination with means for releasably locking said table at either limit of said movement, said secondary card-engaging member being mounted for longitudinal movements with respect to said table and carriage elements and for independent movement into and out of the path of travel of said card, said elements having means locking said secondary member in extreme positions of its longitudinal movement, whereby said secondary member engages said card to move the same from an intermediate position to an advanced position determined by the longitudinally disposed relationship between the table element and the carriage element.

7. The structure defined in claim 6 in further combination with yielding means urging said secondary card-engaging member into the path of travel of said card, said secondary member having a cam surface engaged by the leading edge of said card during its advancing movement toward its intermediate position to cause said secondary member to be moved out of said path of travel of the card against bias of said yielding means.

8. In a printing machine utilizing the spirit transfer process and a plurality of cards having material to be reproduced imprinted thereon, a frame structure, a magazine for holding said cards in horizontally disposed vertically stacked relationship, a carriage element mounted in said frame structure for reciprocatory movements between a retracted card-receiving position adjacent said magazine and an advanced printing position spaced therefrom, a table element mounted on said carriage element for common movements therewith, one end of said table element underlying said magazine when the carriage element is moved to its retracted position, a primary card-engaging member on one of said elements for moving said card from said magazine to an intermediate position at said one end portion of said table element upon advancing movement of said table element, one way stop means permitting advancing movement of said card and holding said card at its intermediate position against common retracting movement with said table element, whereby said card overlies the other end portion of said table element when the same is moved to its retracted position, a secondary card-engaging member carried by one of said elements for moving said card with the table element to an advanced printing position upon a subsequent advancing movement of said carriage element, means for imparting said movements to the table and carriage elements, said last-mentioned means including a lever pivotally secured intermediate its ends to said frame structure and linkage connecting said lever to said carriage element, a mounting arm pivoted at one end to the frame structure for swinging movements of its free end toward and away from said table element in its advanced position, a platen on the free end of said mounting arm, and a rigid link pivotally secured at its opposite ends to said lever and mounting arm for transferring movement of the lever to said arm.

9. In a printing machine utilizing the spirit transfer method and a plurality of cards containing material to be reproduced, said cards each having a laterally outwardly opening longitudinally extending notch in one longitudinal edge thereof, a magazine at the rear of said machine for holding said cards in horizontally disposed vertically stacked relationship, a carriage mounted in said frame structure for reciprocatory movements between a retracted card-receiving position adjacent said magazine and an advanced printing position forwardly spaced therefrom, a table mounted on said carriage for common movements therewith and for independent movements with respect thereto in the direction of movement of the carriage, the rear of said table underlying said magazine when the carriage is in its retracted position, a primary feeding lug on said table engageable selectively with the longitudinal edge of the notch in the lowermost card in said magazine or the opposite longitudinal edge of said card for moving the card from said magazine to an intermediate position on the rear end of the table upon advancing movement thereof, one way stop means permitting advancing movement of said card and holding said card in its intermediate position against common retracting movement with said table, whereby said card overlies the front end portion of said table when the table is moved to its retracted position, a secondary feeding lug on said carriage engageable with the rear longitudinal edge of said card to move the card to an advanced printing position on the table upon a subsequent advancing movement of said carriage and table, means including a lever pivotally mounted on said frame structure and linkage connecting said lever to said carriage for imparting said reciprocating movements to the carriage and table, and a platen operatively coupled to said lever and mounted for lever imparted movements toward and away from engagement with said card in its advanced position on the table.

10. The structure defined in claim 9 in further combination with means for releasably locking said table element at opposite limits of its movement relative to said carriage element, said table element being adapted to be locked at its forward limit of movement with respect to said carriage element when the notches on said cards are disposed rearwardly with respect to the direction of advancing movement thereof, and at its rearward limit of movement relative to said carriage element when said notches are disposed forwardly; and in which said means for imparting movements to said table and carriage elements includes linkage connecting said lever to the carriage element, said linkage comprising an adjustable connection, whereby the feeding travel of the carriage element may be lengthened when the notches of said cards are disposed rearwardly and shortened when said notches are disposed forwardly.

11. The structure defined in claim 10 in further combination with a pair of mirrors mounted on said machine and directed angularly each with respect to a different longitudinally spaced portion of said table element, whereby to reflect the image of the material on said cards, in the selected intermediate positions thereof, to an operator stationed at the front end of said machine.

12. The structure defined in claim 10 in which a portion of said lever overlies the path of travel of said table element, and in further combination with a pair of mirrors and means mounting said mirrors on said lever to direct said mirrors angularly each with respect to a different longitudinally spaced portion of said table element when the lever is moved to its table element retracted position, whereby to reflect the image of the material on said cards, in the selected intermediate positions thereof, to an operator stationed at the front end of said machine.

13. In a printing machine utilizing the spirit transfer process and a plurality of cards having material to be reproduced imprinted thereon, a frame structure, a magazine for holding said cards in horizontally disposed vertically stacked relationship, a carriage element mounted in said frame structure for reciprocatory movements between a retracted card-receiving position adjacent said magazine and an advanced printing position spaced therefrom, a table element mounted on said carriage element for common movements therewith, one end of said table underlying said magazine when the carriage element is moved to its retracted position, a primary card-engaging member on one of said elements for moving said card from said magazine to an intermediate position at said one end portion of said table element upon advancing movement of said table element, first one way stop means permitting advancing movement of said card to its intermediate position and holding said card at its intermediate position against common retracting movement with said table element, whereby said card overlies the other end portion of said table element when the table is moved to its retracted position, a secondary card-engaging member carried by one of said elements for moving said card with the table element to an advanced printing position upon a subsequent advancing movement of said carriage element, means including an operating lever pivotally mounted on said frame structure and linkage connecting said lever to said carriage for imparting said movements to said carriage and table elements, a platen operatively coupled to said lever and mounted for lever imparted movements toward and away from engagement with said card in its advanced position on the table element, second one way stop means permitting advancing movement of said card to its advanced printing position and limiting rearward movement of said card from its advanced position upon retracting movement of said carriage and table elements, said frame structure defining a chamber underlying said table element in the advanced position thereof, a card-receiving tray mounted on said frame structure for sliding movements into and out of said chamber, and yielding means biasing said tray toward a card-receiving position in said chamber.

14. In a printing machine utilizing the spirit transfer process and a plurality of cards having material to be reproduced imprinted thereon, a frame structure, a magazine for holding said cards in horizontally disposed vertically stacked relationship, a table element mounted in said frame structure for supporting each of said cards in a printing position, a primary card-engaging member for feeding said cards in succession from the magazine to a selected one of a pair of intermediate positions on said table element spaced from said magazine, a secondary card-engaging member for moving said cards in succession from their intermediate positions to a selected one of a pair of advanced printing positions on said table element, said secondary members being shiftable longitudinally of the direction of feeding movement of the cards, whereby to shift the range of movement thereof between said selected intermediate positions and said advanced printing positions, means for imparting feeding movements to said card-engaging members to cause advancement of said cards, and a platen mounted for movements toward and away from printing pressure engagement with said cards in their advanced printing positions on said table.

15. In a printing machine utilizing the spirit transfer process and a plurality of cards containing material to be reproduced, a frame structure, a magazine on said frame structure for holding said cards in horizontally disposed vertically stacked relationship, a table element mounted in said frame structure for movements between a retracted card-receiving position under said magazine and an advanced printing position, a card engaging element carried by said table element and engaging a card in said magazine when the table is in its retracted position to move the card out of said magazine upon advancing movement of said table toward its printing position, means including a lever and linkage connecting said lever to said table element for moving said table element and card engaging element in an advancing direction, a platen operatively coupled to said lever and mounted for lever imparted movements toward and away from engagement with said card in its advanced position on the table element, means for holding said cards against common retracting movements with said table when said cards have been advanced to their printing position, said last-mentioned means comprising one way stop elements mounted for relative movements into and out of the path of advancing movement of said cards, said stop elements having cam surfaces engaged by said cards upon advancing movements thereof, whereby to cause relative movement between said stop elements and said cards during advancing movement thereof, said stop elements having abutment surfaces engaged by said cards upon retracting movements of said table element, and a card receptacle underlying the table element in its advanced position for receiving the cards upon retracting movement of the table element from its advanced position of underlying supporting relationship to said cards.

References Cited in the file of this patent

UNITED STATES PATENTS

| | | |
|---|---|---|
| 1,623,542 | Johnson | Apr. 5, 1927 |
| 1,725,400 | Last | Aug. 20, 1929 |
| 1,769,138 | Johnson | July 1, 1930 |
| 1,772,180 | Ford | Aug. 5, 1930 |
| 1,850,922 | Chisholm | Mar. 22, 1932 |
| 2,212,443 | Krell | Aug. 20, 1940 |
| 2,451,213 | Gollwitzer | Oct. 12, 1948 |
| 2,677,543 | Ohrn | May 4, 1954 |